May 8, 1945.  M. KNIGHT ET AL  2,375,369
TRANSPARENT CLOSURE
Filed Jan. 7, 1942  3 Sheets-Sheet 1

Inventors
MILTON KNIGHT.
ROY W. WAMPLER.
WILLIAM J. ARNER.

By Frank Fraser
Attorney

May 8, 1945.　　M. KNIGHT ET AL　　2,375,369
TRANSPARENT CLOSURE
Filed Jan. 7, 1942　　3 Sheets-Sheet 2
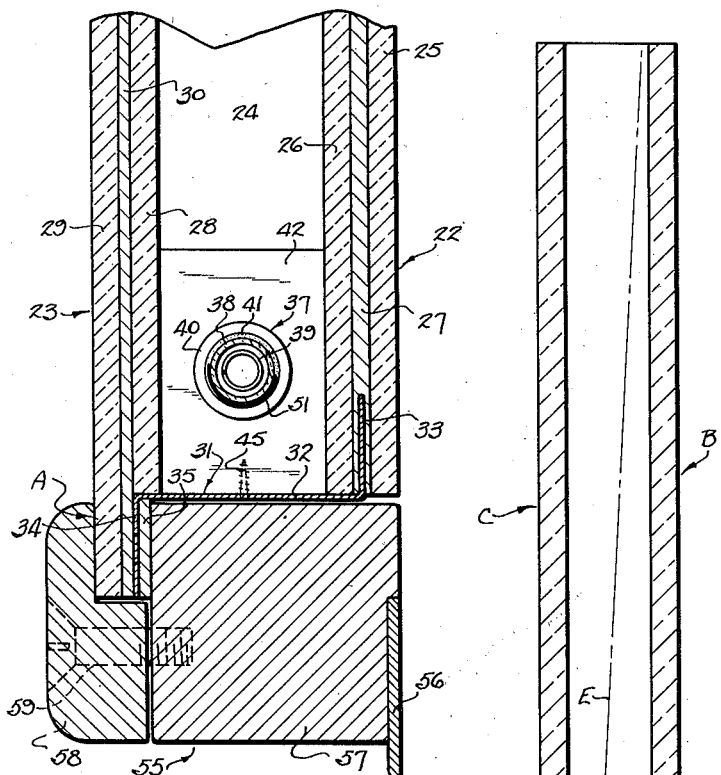
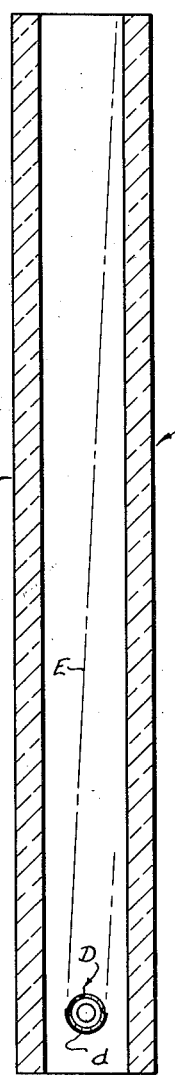
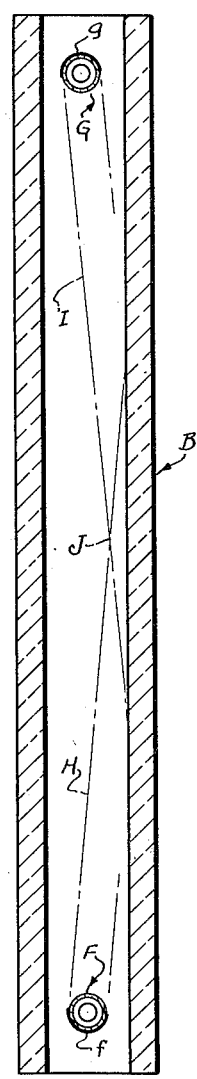
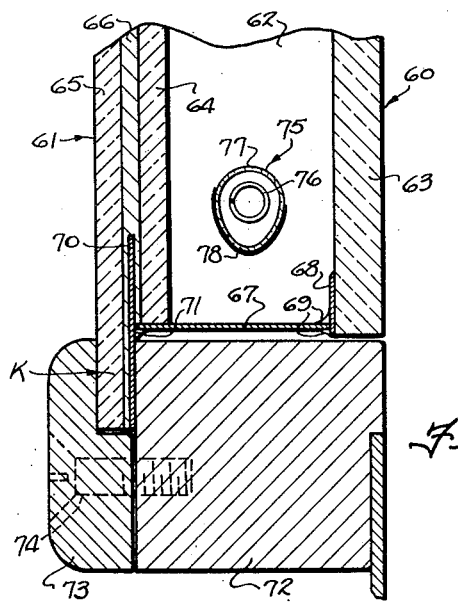
Fig. 4.
Fig. 6.
Fig. 7.
Fig. 9.
Inventors
MILTON KNIGHT.
ROY W. WAMPLER.
WILLIAM J. ARNER.
By Frank Fraser
Attorney May 8, 1945.　　　M. KNIGHT ET AL　　　2,375,369
TRANSPARENT CLOSURE
Filed Jan. 7, 1942　　　3 Sheets-Sheet 3

Inventors
MILTON KNIGHT,
ROY W. WAMPLER,
WILLIAM J. ARNER.

By Frank Fraser
Attorney

Patented May 8, 1945

2,375,369

UNITED STATES PATENT OFFICE 2,375,369

TRANSPARENT CLOSURE

Milton Knight, Maumee, and Roy W. Wampler and William J. Arner, Toledo, Ohio, assignors to Libbey-Owens-Ford Glass Company, Toledo, Ohio, a corporation of Ohio Application January 7, 1942, Serial No. 425,896

3 Claims. (Cl. 20—40.5)

The present invention relates to windshield and/or window constructions particularly adapted for use in airplanes and other aircraft, but which may be advantageously employed for glazing openings wherever adequate clear vision is required under adverse weather conditions.

It is well known to those familiar with aerial navigation that one of the most serious problems attendant to the operation of aircraft is that of ice accumulation on the windshield and/or windows, as well as upon other parts of the ship, while flying through the clouds or in snow, sleet or rain. Airplane ice accumulations are usually divided into two major classes; namely, those producing a loss of flight performance and those which serve as annoyance to the pilot and crew. The obstruction or impairment of vision of the pilot or crew resulting from an accumulation of ice on airplane windshields and/or windows is probably the most outstanding and most frequently encountered annoyance formation.

Generally stated, ice formations fall into three basic types which are termed "rime," "glaze" and "frost" and which may be briefly described as follows:

1. *Rime.*—This type is formed by small cloud particles. It is hard but porous, white and opaque. Small grains, air spaces, and frost-like crystals are found within the mass. Rime is usually encountered in a stable air mass.

2. *Glaze.*—Glaze, or clear ice, is produced by freezing raindrops and sometimes by large cloud particles. Its surface may be either smooth or rippled. It adheres very firmly to the surfaces upon which it forms and is most difficult to remove. Only on relatively infrequent occasions, however, is pure glaze encountered by aircraft. More often, the formation also includes sleet or snow which render its surface rough and irregular. Due to the larger size of the particles contributing to glaze accumulations, higher rates of icing are experienced than with rime.

3. *Frost.*—Frost may be formed on a metal airplane which suddenly flies out of a cold air mass into warmer air.

The most common method now in use for anti-icing windshields is the use of a heated air blast on the inside of the glass. A tap off from the airplane's cabin heating system supplies air at the windshield duct outlets at a temperature of around 170 degrees Fahrenheit. The system is fairly effective in light and moderate icing conditions. In glaze, however, and for rime forming at low temperatures it has been found to be of little benefit.

One of the purposes of the air blast on the windshield is to keep the inside of the glass from frosting over when the airplane is being taxied on the ground. Also, different fluids (alcohol, glycerin, ethylene glycol, etc.) have been sprayed against the outside of the glass, but none has proved satisfactory in itself. The more volatile ones evaporate so rapidly that the cleared portion of the glass freezes over as soon as their use is discontinued. The low-volatile fluids remain on the glass and become a more undesirable obstruction to vision than the ice, since they cannot be removed even by manual means after the icing zone is passed. Many transport planes are equipped with paint scrapers which the pilot not infrequently uses after emerging from an overcast. Power-driven wiper blades are also being used to a limited extent and, while they appear effective for use in rain, they are not at present satisfactory for ice removal unless they can be supplemented with sufficient application of heat and anti-icing fluids. Deflectors have been used over a portion of the windshields of some airplanes, but so far have been of no value other than in very light ice or rain.

The general object of this invention is to prevent the formation of ice accumulation, including snow, sleet, frost, etc., on the windshields and/or windows of airplanes and other aircraft, or to effect the removal of such ice accumulation, whereby to maintain an adequate unobstructed or clear vision area under adverse weather conditions.

Another object of the invention is the provision of an improved windshield or window construction having associated therewith novel anti-icing or de-icing means for effectively preventing and/or removing ice accumulation on the glass surfaces.

A further object of the invention is the provision of an improved windshield or window construction in which the accumulation of ice on the glass surfaces is prevented or removed by utilization of radiant energy in the infra-red region of the spectrum.

A still further object of the invention is the provision of an improved windshield or window construction embodying one or more heating units for radiating infra-red rays upon the glass and some of which are absorbed thereby to heat the glass and some of which are transmitted through the glass and absorbed by the film of water or ice thereon to effect the removal thereof or to prevent such accumulation.

Other objects and advantages of the invention will become more apparent during the course of the following description, when taken in connection with the accompanying drawings.

In the drawings, wherein like numerals are employed to designate like parts throughout the same:

Fig. 4 is a vertical section taken substantially on line 4—4 of Fig. 2;

Figs. 6 and 7 are diagrammatic views illustrating two different arrangements of heating units;

Figs. 9 and 10 are transverse sections through two modified types of windshield or window constructions.

Generally stated, this invention is primarily concerned with the utilization of that region of the spectrum known as the infra-red, in which the unit of measurement most generally used is the micron, and whose limits roughly lie between 0.7 and 10 microns. The infra-red rays are radiated from a source of heat and penetrate and are absorbed by the body on which they are directed and used to raise the temperature of the absorbing body.

Briefly, the improved windshield or window construction herein provided comprises one or more transparent glass panels one or more infra-red heating units. The infra-red rays radiated by the heating unit or units are directed upon the outer transparent panel with a part of the heat rays being transmitted through the glass and a part absorbed thereby. The rays which are absorbed by the glass will result in the heating up of the glass body to a temperature sufficient to effect the removal of a film of water or ice which may have formed upon the outer surface of the panel or to prevent such accumulation. On the other hand, the rays which are transmitted through the glass will be absorbed by the film of water or ice and thereby also assist in the removal thereof.

Figure 1:
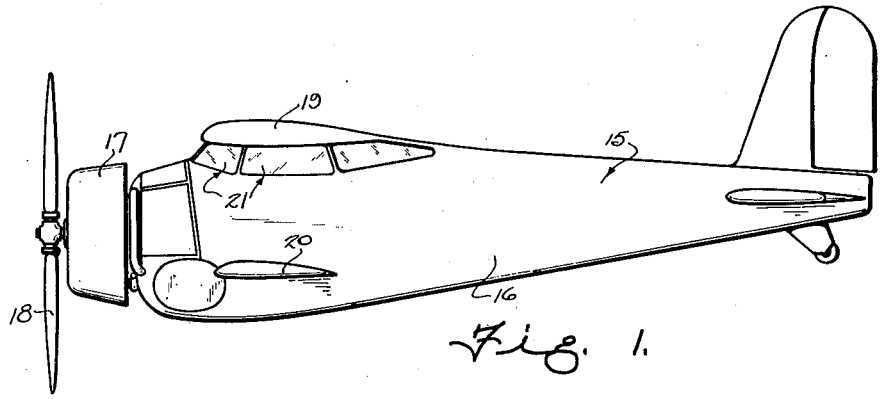
Fig. 1 is a side elevation of one type of airplane with which the present invention may be used.

With reference now to the drawings and particularly to Fig. 1, there is shown an airplane 15 of that type having a fuselage 16 with a forwardly located engine 17 and propeller 18. The plane is also provided with upper and lower wings 19 and 20 respectively and a cockpit having the transparent closures 21 which completely enclose the pilot and enable him to have a wide sphere of vision. The transparent closures 21 include the windshield which is located in front of the pilot and the windows arranged along opposite sides of the plane. It will, of course, be appreciated that the airplane herein disclosed is simply one type of plane with which the present invention may be used and that it is adapted for use in aircraft of all kinds. In fact, the invention may be used in glazing any opening where adequate clear vision is required under adverse weather conditions, such as, for example, in aircraft carriers and other naval vessels, airport control towers, lighthouses, etc.

Figure 2:
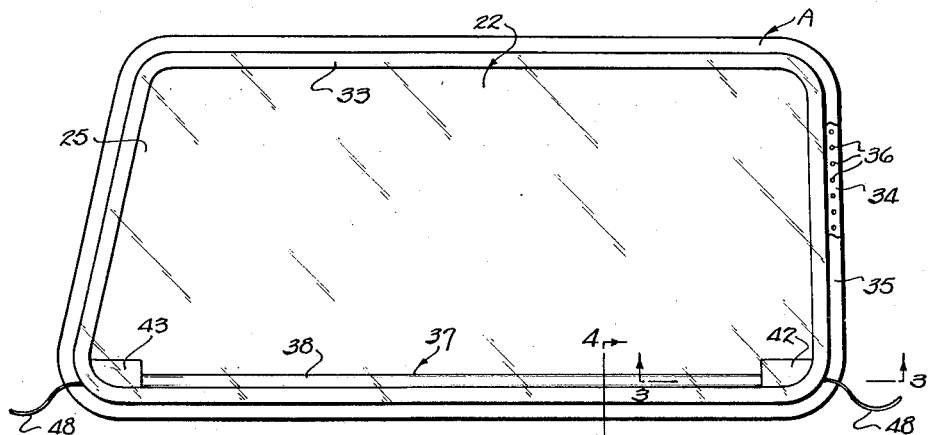
Fig. 2 is a plan view of an improved windshield or window construction provided by the invention.
Figure 3:
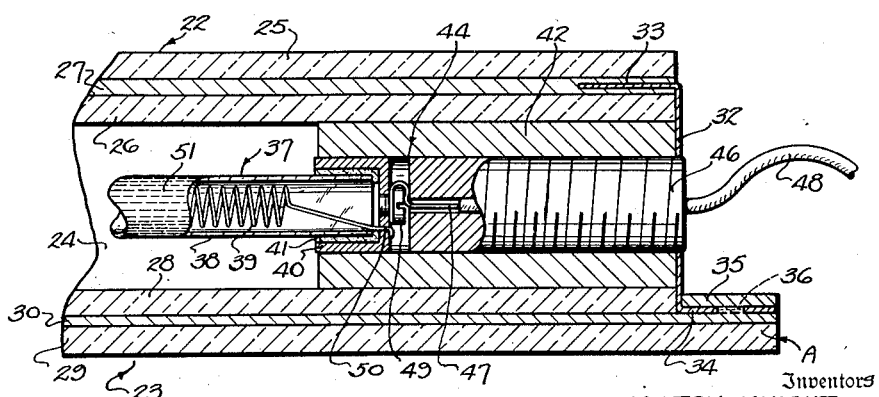
Fig. 3 is a horizontal section taken substantially on line 3—3 of Fig. 2.

Referring particularly to Figs. 2, 3 and 4, there is disclosed a transparent closure 21 in the form of a double glazing unit comprising the outer and inner transparent panels 22 and 23 arranged in face to face relation, but spaced from one another to provide an air space 24 therebetween. The outer transparent panel 22 consists of a sheet of laminated safety glass including two sheets of glass 25 and 26 and an interposed layer of plastic material 27 adherent thereto. Although the invention is not restricted to the use of any particular kind of glass, it is preferred that the outer sheet 25 be of a heat-absorbing glass, while the inner sheet 26 be of a special crown glass having a high light and radiant energy transmission. Likewise, it is preferred that both glass sheets 25 and 26 be semi-tempered although they may be fully tempered or not tempered at all.

The plastic interlayer 27 preferably comprises a relatively thick sheet of synthetic resin material such as polyvinyl acetal resin. By way of example only, the plastic interlayer may be formed of polyvinyl butyr acetal resin plasticized with approximately 25 parts dibutyl sebacate per 100 parts of resin by weight. However, different plastics varying in thickness and physical characteristics may be employed and the invention is not limited to the use of any particular resin, class of resins, cellulosic derivatives or the like.

The inner transparent panel 23 also consists of a sheet of laminated safety glass including the two glass sheets 28 and 29 and interposed layer of plastic material 30 adherent thereto. The glass sheets 28 and 29 are preferably formed of a special crown glass having a high light transmission and being practically colorless. The glass sheets are also preferably semi-tempered, although they may be fully tempered if desired. Likewise, the sheets 28 and 29 may consist of ordinary plate or window glass. The plastic interlayer 30 may be formed of the same material as the plastic interlayer 27 in the outer transparent panel 22 or an entirely different type of plastic may be employed.

The two transparent panels 22 and 23 are secured together in predetermined spaced relation to form a unit construction by metal separator means 31 extending around the edges thereof. The separator means 31 comprises a plurality of substantially Z-shaped metal strips, each having a flat intermediate spacer portion 32 extending between the transparent panels 22 and 23, said spacer portion 32 being provided along one edge with an inturned flange 33 embedded in the plastic interlayer 27 of outer panel 22 and along its opposite edge with an outwardly directed flange 34 secured to the plastic interlayer 30 of inner panel 23.

As illustrated, the outer glass sheet 28 of inner panel 23 is relatively smaller than the inner glass sheet 29 and plastic interlayer 30 so that the said inner glass sheet and plastic interlayer project beyond the outer glass sheet to provide an attaching portion indicated by the letter A. The flange 34 of metal separator 31 is secured to the inner panel 23 by bonding it between the extended portion of the plastic interlayer 30 and a strip of plastic material 35. This can be accomplished by first placing the metal flange 34 on the extended plastic and then laying the strip of plastic material 35 on said metal flange, after which the assembly can be subjected to heat and pressure. The metal flange 34 is preferably provided with a series of relatively small holes 36 so that upon softening of the interlayer 30 and strip 35, the plastic will pass through the said holes and bond to one another as indicated in Fig. 3, thereby firmly securing the metal spacer to the inner panel 23.

Arranged between the two transparent panels 22 and 23 and extending longitudinally thereof adjacent its bottom edge is an infra-red heating unit designated in its entirety by the numeral 37; said unit comprising a glass tube 38 within which is arranged an electrical heating coil 39. Fitting over each end of the glass tube 38 is a metal cap 40 secured to said tube by a relatively thin layer of plaster of Paris or other suitable cement 41. The metal caps 40 at opposite ends of the glass tube 38 are supported by blocks 42 and 43, said blocks being formed of any suitable insulating material and each having a central bore 44 for receiving the respective cap 40 therein. The blocks 42 and 43 may be secured to the metal separator strips 31 in any desired manner, such as by means of screws or the like 45 (Fig. 4).

Threaded within the outer end of the bore 44 of each block 42 and 43 is a fiber plug 46 through which extends a connector wire 47 provided with the usual covering of insulation 48. The inner end of the wire 47 extends beyond the plug 46 and is secured to a screw 49 carried by the respective metal cap 40. Each end of the resistance coil 39 passes through an opening in the respective metal cap 40 as indicated at 50 and may be suitably secured to said cap by soldering or the like. However, the opposite ends of the heating coil 39 may be fastened directly to the screws 49 if desired.

Figure 5:
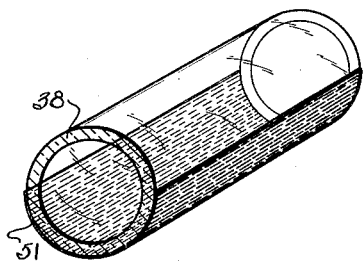
Fig. 5 is a perspective view of a portion of the heating unit showing one form of reflector.

As shown in Fig. 5, the glass tube 38 containing the heating coil 39 is cylindrical in cross section and is provided upon its outer surface with a coating 51 of metal or other desired material to form a reflector for directing the radiant heat from the heating coil upon the outer transparent panel 22. The coating 51 is preferably, though not necessarily, formed of aluminum and covers substantially one-half of the circumference of the glass tube 38. The tube 38 should be formed of a high infra-red transmission glass, which may be either clear or colored.

While the heating unit 37 may be set with the reflector 51 normal to the outer transparent panel 22, it is preferred that it be so disposed with respect thereto that the infra-red rays will strike the panel at an angle. By way of example, a 45° angle of incidence has been found to give satisfactory results, although the angle of incidence may be varied as desired to meet varying conditions.

In operation, the infra-red rays radiated upon the outer transparent panel 22 by the heating unit 37 will be largely transmitted through the inner sheet of crown glass 26 and plastic interlayer 27 and will be absorbed by the sheet of heat-absorbing glass 25. The infra-red radiation absorbed by the sheet of heat-absorbing glass 25 will result in the heating thereof and will, in turn, heat the film of water or ice formed upon the outer surface of the panel to effect the removal thereof. A large portion of those infra-red rays which are transmitted through the sheet of heat-absorbing glass will be absorbed by the ice and water on the outer surface of the glass sheet to further assist in their removal.

As pointed out above, the inner glass sheet 26 of outer panel 22 has a relatively high light and radiant energy transmission, and this is also true of the plastic interlayer 27. Therefore, most of the infra-red rays will be transmitted through the inner glass sheet and plastic interlayer and will be absorbed by the outer sheet of heat-absorbing glass, heating the outer surface thereof to a relatively higher temperature than would be the case if two sheets of heat absorbing glass were used. Furthermore, if the inner glass sheet 26 were also of heat-absorbing glass it would tend to absorb a greater amount of the infra-red rays and would thereby heat up the plastic interlayer to an undesirable temperature. On the other hand, by using a high transmission glass for the inner sheet the plastic interlayer can be maintained relatively cooler. The inner panel 23 is preferably formed of two glass sheets having a relatively high light and radiant energy transmission since it is desirable to maintain the inner panel as cool as possible.

The amount of heat radiated by the heating unit 37 will be dependent upon a number of variable factors, such as the characteristics of the source of electrical energy, the gauge of wire used for the resistance coil 39, the length of the coil, etc. However, it is desired that the electric heater be designed to produce as high a total of radiant energy, coupled with as high a total absorption by the glass and water, as is possible. In other words, since the total radiant energy produced increases with the temperature, a high temperature is desired. However, for sources of comparatively high temperatures (2,500 to 5,000° K.) glass has a high transmission, and since it is desired to have the energy absorbed by the glass, it is desirable to have the wave length of maximum emission where the glass is absorbing strongly. That is, it is preferred to produce as high a temperature as is consistent with high energy absorption of the glass. By using an outer sheet of heat absorbing glass, higher temperature heaters may be employed.

In Figs. 6 and 7 are illustrated diagrammatically two double glazing units, each including the spaced outer and inner transparent panels designated by the letters B and C respectively. In Fig. 6, a single infra-red heating unit D is employed and the reflector d thereof is set at such an angle with respect to the outer transparent panel B that the infra-red radiation from the heater will cover substantially the entire viewing area of the panel as represented by the broken lines E. On the other hand, in Fig. 7, two infra-red heating units F and G are provided along the upper and lower edges of the glazing unit and the reflectors f and g thereof are disposed at such an angle with respect to the outer transparent panel B that each covers approximately two-thirds of the viewing area as represented by the lines H and I respectively. As a result, the rays from the heaters F and G overlap at substantially the center of the panel as indicated at J. As is well known, the greater the distance the rays travel from the heaters, the less effective they will be. However, the overlapping of the infra-red radiation from the two heaters F and G along the center line of the outer panel will result in the heating of the central portion of the panel to substantially the same extent as the top and bottom portions thereof.

Figure 8:
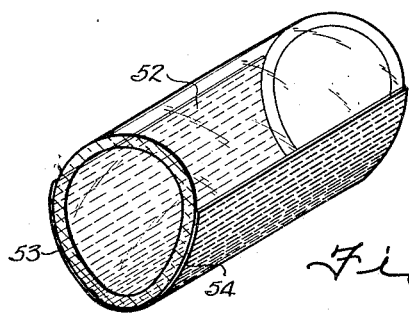
Fig. 8 is a perspective view of another form of reflector for the heating unit.

Although the glass tube 38 and reflector 51 of the heating unit may be cylindrical, as described above, a parabolic reflector can also be employed and in some cases would be preferred. For instance, in Fig. 8 is illustrated a glass tube 52 having substantially one-half thereof shaped to form a parabola in cross section as indicated at 53 and provided with a coating 54 of metal or other suitable material to form a reflector having a parabolic contour.

The windshield or window construction forming the transparent closure 21 may be mounted in any desired manner. By way of example, the closure is shown in Fig. 4 as being mounted within a frame 55 forming part of an airplane and in which the skin of the ship is indicated at 56. The frame 55 comprises a stationary member 57 within which the closure is arranged, with the outer surface of the outer panel 22 substantially flush with the skin 56 of the ship. The extended portion A of the inner panel 23 overlaps the inner face of the stationary frame member 57 and is clamped thereagainst by a plate 58 secured by screws or the like 59. Obviously, however, the invention is not restricted to the particular type of mounting herein disclosed.

In Fig. 9 is illustrated another type of double glazing unit comprising the outer and inner transparent panels 60 and 61 respectively spaced from one another to provide an air space 62 therebetween. The outer panel 60 preferably consists of a single sheet of heat-absorbing glass 63, while the inner panel 61 comprises a sheet of laminated safety glass including the two sheets of glass 64 and 65 and an interposed layer of plastic 66 adherent thereto. The two transparent panels 60 and 61 are secured together in properly spaced relation by metal separator strips 67 secured along one edge to a metallic coating 68 on the outer panel 60 by fillets 69 of solder or other suitable metal. The metallic coating 68 is preferably, though not necessarily, sprayed upon the glass.

Embedded within the plastic interlayer 66 of the inner panel 61 are metal plates 70 which extend beyond the outer glass sheet 64 and to which the metal spacers 67 are secured by a solder fillet 71 or in some other suitable manner. The inner glass sheet 65 also extends beyond the outer glass sheet 64 as does the plastic interlayer 66 inwardly of the metal plates 70. These extended portions of the inner transparent panel form an attaching flange K which is clamped between the frame members 72 and 73 by screws or the like 74.

As shown in Fig. 9, the infra-red heating unit 75 comprises an electrical heating coil 76 housed within a glass tube 77 which is provided with a coating of metal 78 to form a parabolic reflector of the type illustrated in Fig. 8. As above described, the infra-red rays radiated from the electric heater 75 will be largely absorbed by the sheet of heat-absorbing glass 63 and will serve to raise the temperature of the glass sufficiently to cause the melting of a film of ice or water upon the outer surface thereof or to prevent the accumulation thereof. Likewise, certain of the infra-red rays which are transmitted through the sheet of heat-absorbing glass will be absorbed by the ice and water on the outer surface of the glass sheet to assist in their removal.

In certain instances, it may be found desirable to use a sheet of special crown glass rather than a sheet of heat-absorbing glass for the outer panel 60. In such case, the glass would transmit a maximum amount of radiant energy and this energy would be absorbed directly by the film of water or ice on the outer surface of the panel. Thus, it has been found that the initial rise in temperature of water resting on crown glass is greater than that of water on heat-absorbing glass when an infra-red heater is radiating to the glass. However, after several minutes, the temperature of the water upon the heat absorbing glass increases and finally exceeds that of the water on the crown glass. Under certain circumstances, it may be found desirable to obtain this greater initial rise in the temperature of the water or ice.

Figure 10:
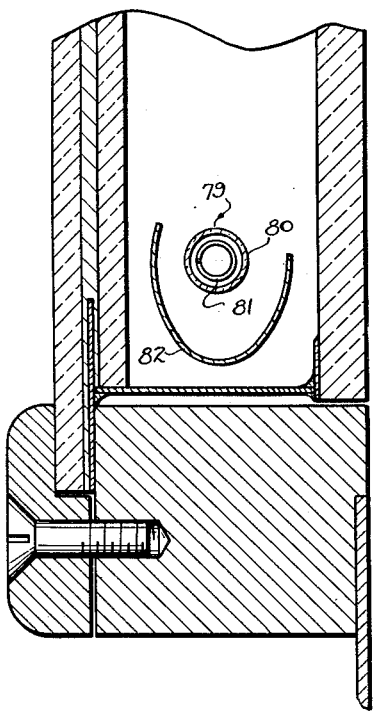

In Fig. 10 is illustrated a double glazing unit of the same type shown in Fig. 9, except for the construction of the infra-red heating unit 79. More particularly, this heater comprises a glass tube 80 cylindrical in cross section and containing the electrical heating coil 81. Associated with the glass tube 80 is a separate parabolic reflector 82, preferably of metal.

It may also be found desirable in some cases to omit the glass tube in which the heating coil is arranged and to provide a separate reflector as shown in Fig. 10. Likewise, other forms of electrical heating elements may be employed, such as, for instance, a tubular or bar type heater. The herein described principle of de-icing glass surfaces by the utilization of radiant energy in the infra-red region of the spectrum is also not limited to double glazing units but may be advantageously employed for de-icing windshields or windows comprising single sheets or plates of glass.

It is to be understood that the forms of the invention herewith shown and described are to be taken simply as illustrative embodiments of the same, and that various changes in the shape, size and arrangement of parts may be resorted to without departing from the spirit of the invention or the scope of the subjoined claims.

We claim:

1. A transparent closure, comprising a sheet of laminated safety glass including two sheets of glass and an interposed layer of plastic adherent thereto, one of the glass sheets being formed of a glass having high heat-absorbing properties as compared with the other glass sheet and with the plastic inter-layer, and said other sheet being of a glass having a high light and radiant energy transmission as compared with the first-mentioned sheet, and a source of radiant energy for directing radiant heat directly upon the high light and radiant energy transmitting glass sheet to be transmitted through said glass sheet and through the plastic interlayer and to be absorbed by and to heat said heat-absorbing glass sheet.

2. A transparent closure, comprising a sheet of laminated safety glass including two sheets of glass and an interposed layer of plastic adherent thereto, the outer glass sheet being formed of a glass having high heat-absorbing properties as compared with the inner glass sheet and with the plastic interlayer and said inner sheet being of a glass having a high light and radiant energy transmission as compared with the first-mentioned sheet, and means on the inner side for heating the sheet of safety glass by infra-red radiation directed against the sheet of high light and radiant energy transmitting glass to be transmitted through said glass sheet and through the plastic interlayer and to be absorbed by and to heat said heat-absorbing glass sheet.

3. A transparent closure, comprising a sheet of laminated safety glass including two sheets of glass and an interposed layer of plastic adherent thereto, the outer glass sheet being formed of a glass having high heat-absorbing properties as compared with the inner glass sheet and with the plastic interlayer and said inner sheet being of a glass having a high light and radiant energy transmission as compared with the first-mentioned sheet, and an electrical heating unit for radiating infra-red rays having a wave length between approximately 0.7 and 10 microns upon the inner sheet of high light and radiant energy transmitting glass to be transmitted through said glass sheet and through the plastic interlayer and to be absorbed by and to heat said heat-absorbing glass sheet.

MILTON KNIGHT.
ROY W. WAMPLER.
WILLIAM J. ARNER.